United States Patent Office 3,542,746
Patented Nov. 24, 1970

3,542,746
PROCESS FOR PREPARING CHLORO-
SULFONATED POLYETHYLENE
Carl Robert Eckardt and Robert Fuhrmann, Morris
Plains, and Oliver Alfred Barton, Florham Park, N.J.,
assignors, by mesne assignments, to The Dow Chemical
Company, Midland, Mich., a corporation of Delaware
No Drawing. Filed Mar. 18, 1966, Ser. No. 535,339
Int. Cl. C08f 3/06, 27/02, 27/06
U.S. Cl. 260—79.3                                3 Claims

ABSTRACT OF THE DISCLOSURE

High molecular weight, substantially noncrystalline chlorosulfonated polyethylene which may be cured to afford rubbery products is produced by contacting at 0° to 100° C. in the absence of solvent, particulate chlorinated polyethylene having a chlorine content ranging from about 20% to about 50% by weight, less than 1% crystallinity and an intrinsic viscosity of at least 2.5 deciliters per gram in o-dichlorobenzene at 100° C. with a gaseous mixture of chlorine and sulfur dioxide wherein the weight ratio of sulfur dioxide to chlorine in said mixture ranges from about 20:1 to about 1:10.

---

This invention relates to novel chlorosulfonated polyethylene and methods for its preparation and in particular relates to chlorosulfonated high molecular weight, high density polyethylene. This invention further relates to cured rubber-like compositions of outstanding strength that are prepared from this chlorosulfonated polyethylene.

Polyethylene can be reacted with chlorine and sulfur dioxide to give products in which some of the hydrogens of the original polyethylene have been replaced by chlorine and by sulfonyl chloride, —$SO_2Cl$, groups. The properties of the final product are dependent upon the extent of substitution and the relative proportion of the two substituents, as well as the particular polyethylene employed and the chlorosulfonation procedure used. Heretofore, chlorosulfonated polyethylene has been prepared from low density, branched polyethylene by adding chlorine to a solution of the polyethylene, followed by the introduction of a mixture of chlorine and sulfur dioxide into the solution. In U.S. Pat. 2,982,759 of Heuse, a similar procedure is employed to chlorosulfonate high density polyethylene; however, this patent is limited to polyethylene having a melt index of at least 0.2, which corresponds to a maximum molecular weight of 175,000. It is stated that high density polyethylenes having molecular weights of over 175,000 are not sufficiently soluble to be used in the recited solution chlorosulfonation technique. The Heuse patent further discloses that in previously proposed methods of chlorosulfonating high density polyethylene without using a solution, i.e., chlorosulfonation of dry particles or particles suspended in an inert liquid, the product is a resinous pulverulent material which cannot be used to produce rubber-like compositions.

In British Pat. 858,674, issued Jan. 11, 1961 to Allied Chemical Corporation, there are disclosed high density polyethylenes having molecular weights of between 500,000 and 5 million and which possess immeasurably low melt indexes by the procedure of ASTM D 1238–52T, e.g., there is no measurable flow under the specified conditions. These polymers, thus, have molecular weights far higher than the maximum permitted in the Heuse patent.

It is, therefore, an object of this invention to provide chlorosulfonated polyethylenes derived from high density, high molecular weight polyethylene, said chlorosulfonated product being useful in the preparation of rubber-like compositions.

It is a further object of this invention to provide cured rubber-like products from the above chlorosulfonated polyethylene.

Additional objects and advantages of the present invention will be apparent from the following detailed description thereof.

In accordance with the present invention, it has been found that chlorosulfoated polyethylene useful in the preparation of rubber-like compositions can be prepared from substantially linear high density polyethylene having molecular weights of about 500,000 to 5 millon and preferably 700,000 to 3.5 million by adding the chlorine and sulfonyl chloride substituents by the procedure hereinafter described. Suitable linear high molecular weight polyethylenes can be prepared, as described in the above-cited British Pat. 858,674, by gas phase polymerization of anhydrous, oxygen-free ethylene below the softening point of the polyethylene over a porous, frangible catalyst of an inorganic compound of chromium and oxygen and an active metal alkyl on a support of the group consisting of silica and silica-alumina. The polyethylenes produced have densities between about 0.935 and about 0.985, crystallinities of at least 60%, and customarily in the range of 65% to 85%, as determined, for example, by differential thermal analysis, and intrinsic viscosities of about 4.5 to 21 and preferably about 5.7 to 16.7 deciliters per gram in decalin at 135° C. The molecular weights of these polyethylenes, which range from about 500,000 to 5 million, and preferably about 700,000 to 3.5 million, are calculated in accordance with the method of P. S. Francis et al., Journal of Polymer Science, vol. 31, p. 453, 1958, from their intrinsic viscosities in about 0.05 to 0.1 gram per 100 cc. solutions in decalin at 135° C. using the equation: $n = 6.77 \times 10^{-4} M^{0.67}$, where $n$ is equal to intrinsic viscosity and M equals molecular weight.

In preparing the chlorosulfonated polyethylene of this invention, the above-described high density, high molecular weight polyethylene must first be chlorinated to a chlorine content of about 20–50% by weight using a procedure which reduces crystallinity of the polymer to less than 1% as determined by differential thermal analysis. The polymer should not be depolymerized to any appreciable extent during the chlorination, and the chlorinated polymer should have an intrinsic viscosity of at least 2.5, generally about 2.5–6.0, as measured in a 0.5% solution in o-dichlorobenzene at 100° C.

Chlorinated polyethylenes suitable for use in the present invention can be prepared by a chlorination process of the type disclosed in British Pat. 950,374 of Feb. 26, 1964 to Allied Chemical Corporation. By such processes, high density, high molecular weight polyethylene having a crystallinity of over 60% is chlorinated by a two-stage chlorination in aqueous slurry to yield a product having a crystallinity of less than 1%. In a typical process, the first stage chlorination is carried out in aqueous slurry at temperatures below the crystalline melting point of the ethylene polymer, preferably at a temperature of about 60° to 130° C., desirably at 90°–110° C., until at least about 5%, preferably about 10%, of chlorine has been introduced into the polymer. In the second stage, the chlorination is continued in the aqueous slurry at a temperature maintained above the crystalline melting point of the polymer, but below the softening point of the chlorinated outer coating thereof, until the desired chlorine is added. Second-stage chlorination temperatures are of the order of at least about 135° C., and preferably lie in the range of about 135° to 150° C. At least 5% chlorine by weight must be added in the second stage. If desired, chlorination in the second stage can be carried out at a temperature above the crystalline melting point of the polymer for a time sufficient to add at least about 5% chlorine by weight, preferably until at least a total of 20% chlorine is added to the polymer, and the chlorination then continued at a lower temperature, e.g., 110° to 120° C., until the desired total chlorine is added.

The chlorinated polyethylene is treated with a mixture of sulfur dioxide and chlorine to substitute sulfonyl chloride groups on the polymer. This treatment is preferably carried out at a temperature of about 0°–100° C. by passing a gaseous mixture of chlorine and sulfur dioxide through the particles of the chlorinated polyethylene. The ratio of sulfur dioxide to chlorine in the gaseous mixture is preferably in the range of about 20:1 to 1:10. When the higher proportions of chlorine are used, chlorine groups, as well as sulfonyl chloride groups, are added onto the polymer. However, it is preferable to add at least 20% by weight of chlorine to the polymer by the above-described two-stage aqueous slurry chlorination procedure before chlorosulfonation. The chlorosulfonation can be run in the dark or catalyzed with actinic light.

The chlorosulfonated polyethylene of this invention must be substantially free of crystallinity and must contain about 25–50% by weight of chlorine and 0.5–3.0% by weight of sulfur to be useful in the preparation of rubber-like compositions. Preferably the chlorosulfonated polyethylene contains 30–45% by weight of chlorine and 0.6–1.5% by weight of sulfur. Rubber-like compositions can be obtained from the chlorosulfonated polyethylene by curing them with commercial curing agents. Particularly outstanding results are obtained when the chlorosulfonated polyethylene is cured with 10 to 60 parts per 100 parts polymer of a polyvalent metal compound selected from the group consisting of polyvalent metal oxides, polyvalent metal hydroxides and polyvalent metal salts of acids having ionization constants of less than $1 \times 10^{-3}$. Illustrative of such curing agents are litharge, lead tetraoxide, magnesium oxide, zinc oxide, barium oxide, lead hydroxide, magnesium hydroxide, zinc hydroxide, barium hydroxide, zinc stearate, lead abietate, magnesium adipate, lead sulfite, lead acetate, magnesium propionate, lead oleate, lead benzoate, lead palmitate, and calcium carbonate. Curing is effected by heating the mixture at about 100°–180° C. for a period of from about 5 to 60 minutes. Generally, the curing is carried out under a pressure ranging from about 15 to 1000 pounds per square inch. The cured compositions of this invention have markedly improved properties over the cured compositons obtained by employing chlorosulfonated polyethylene prepared by solution chlorosulfonation of polyethylene having a maximum molecular weight of 175,000. The improved properties of applicant's compositions include superior strength as indicated by higher tensile strength, modulus, and tear resistance, and greater ability to recover from compressive deformation as indicated by a lower compression set. Employing the chlorosulfonated polyethylene of this invention not only makes it possible to obtain a product having improved properties, but in meeting a given set of properties more extender can be used than with the previously known chlorosulfonated polyethylenes.

The chlorosulfonated polyethylene is generally admixed with other compound ingredients besides the curing agents, the particular ingredients and their amounts being dependent upon the intended use. Suitable additives include fillers such as carbon black, titanium dioxide, barium sulfate, kaolin, diatomaceous earth, powdered talc, and calcium sulfate; accelerators such as benzothiazyl disulfide and dipentamethylene thiuram tetrasulfide; antioxidants such as nickel dibutyl dithiocarbamate; waxes such as chlorinated aliphatic paraffin waxes and low molecular weight polyethylene wax; aromatic oil extenders; and weak monobasic or polybasic acids such as stearic acid or rosin.

The following examples are given to further illustrate the invention, but it is to be understood that the invention is not to be limited in any way by the details described therein. In the examples, the chlorinated polyethylenes were derived from high density, high molecular weight, linear polyethylenes prepared in accordance with Example 6 of British Pat. 858,674, cited above, by gas phase polymerization of anhydrous, oxygen-free ethylene over a catalyst of magnesium dichromate on a porous support of about 90% silica and 10% alumina. The polyethylenes had densities of about 0.94, melting points of about 133° C., intrinsic viscosities of about 7 to 9 deciliters per gram as measured in decalin at 135° C., crystallinities of about 70% as measured by differential thermal analysis, and immeasurably low melt indexes under the conditions of ASTM D1238–52T. Samples of these polyethylenes were chlorinated in 8% aqueous slurries regulating the temperature to obtain a product having a crystallinity of less than 1%. Chlorination was carried out at a temperature of 100° C. until the polymers contained about 10% by weight chlorine. The temperature was then raised to 140° C. while adding approximately another 10% by weight of chlorine, and chlorination was continued at 140° C. until chlorine contents of 28 to 41% by weight were obtained. These chlorinated polyethylenes are referred to in the examples as linear high molecular weight chlorinated polyethylene. Parts in the examples represent parts by weight and intrinsic viscosities were measured in o-dichlorobenzene at 100° C.

EXAMPLE 1

722 parts of linear high molecular weight chlorinated polyethylene having a chlorine content of 36.5% by weight and an intrinsic viscosity of 2.71 was charged into a glass-walled reactor equipped with a helical screw agitator and inlet and outlet tubes for gas. A gaseous mixture of sulfur dioxide and chlorine containing 20.9 parts of sulfur dioxide per part of chlorine was fed into the reactor at a rate of 765 parts per hour while maintaining the reactants at room temperature and exposing them to incident light. The chlorosulfonation was run for two hours giving a product having a chlorine content of 37.2% by weight, a sulfur content of 0.64% by weight and an intrinsic viscosity of 3.55. The chlorosulfonated product was compounded in accordance with the following recipe:

| | Parts by weight |
|---|---|
| Chlorosulfonated polymer | 100 |
| Carbon black | 60 |
| Aromatic oil extender | 40 |
| Chlorinated wax (40% chlorine) | 35 |
| Polyethylene wax | 2 |
| Lead monoxide | 25 |
| Nickel dibutyl dithiocarbamate | 3 |
| Benzothiazyldisulfide | 0.5 |
| Dipentamethene thiuram tetrasulfide | 2 |

A portion of the resultant composition was cured in a mold for 5 minutes at 330° F. and a pressure of 500 to 700 p.s.i. to form a sheet 0.08 inch thick. The cured product had the following properties.

Ultimate tensile strength (ASTM D 412–51T)—3220 p.s.i.
Ultimate elongation (ASTM D 412–51T)—320%
300% modulus (ASTM D 412–51T)—3060 p.s.i.

A 0.5-inch thick button was prepared by molding a portion of the above composition at 330° F. for 25 minutes. The compression set of this button was 27 as measured in accordance with ASTM D 395–55.

EXAMPLE 2

630 parts of linear high molecular weight chlorinated polyethylene having a chlorine content of 27.2% by weight and an intrinsic viscosity of 3.33 was charged to the equipment of Example 1. A gaseous mixture of sulfur dioxide and chlorine containing 16.2 parts sulfur dioxide per part of chlorine was fed into the reactor at a rate of 775 parts per hour while maintaining the reactants at 32° C. and exposing them to incident light. The chlorosulfonation was run for 2 hours giving a product having a chlorine content of 28.5% by weight, a sulfur content of 1.06% by weight, and an intrinsic viscosity of 3.86. The chlorosulfonated product was compounded in accordance with the recipe of Example 1 and part of the resultant composition was cured in a mold at 500–700 p.s.i. pressure for 5 minutes at 330° F. to form a sheet 0.08-in. thick. The cured product had the following properties.

Ultimate tensile strength—3300 p.s.i.
Ultimate elongation—400%
300% modulus—2700 p.s.i.

A molded button was prepared by the procedure described in Example 1 and determined to have a compression set of 15.

EXAMPLE 3

724 parts of linear high molecular weight chlorinated polyethylene having a chlorine content of 37.8% and an intrinsic viscosity of 4.42 was charged to the equipment of Example 1. A gaseous mixture of sulfur dioxide and chlorine containing 16.2 parts of sulfur dioxide per part of chlorine was fed into the reactor at a rate of 775 parts per hour while maintaining the reactants at 35° C. and exposing them to incident light. The chlorosulfonation was continued for 5 hours giving a product having a chlorine content of 38.0% by weight and a sulfur content of 2.60% by weight and an intrinsic viscosity of 3.23.

The chlorosulfonated product was compounded in accordance with the recipe of Example 1 and part of this composition was cured in a mold for 15 minutes at 330° F. and a pressure of 500–700 p.s.i. to form a sheet 0.08 in. thick. The product had the following properties.

Ultimate tensile strength—2400 p.s.i.
Ultimate elongation—280%

A molded button was prepared as in Example 1 and determined to have a compression set of 34.

EXAMPLE 4

563 parts of linear high molecular weight chlorinated polyethylene having a chlorine content of 27.2% and an intrinsic viscosity of 3.33 was charged to the equipment of Example 1. A gaseous mixture of sulfur dioxide and chlorine in which the ratio of sulfur dioxide to chlorine was 16.2:1 was fed into the reactor at a rate of 775 parts per hour while maintaining the reactants at 31° C. The glass reactor vessel was covered with aluminum foil so that the reaction was run in the dark. The chlorosulfonation was continued for 2 hours giving a product having a chlorine content of 28.6% by weight and a sulfur content of 0.52% by weight. The chlorosulfonated product was compounded in accordance with the recipe of Example 1 and part of this composition was cured in a mold for 15 minutes at 330° F. and a pressure of 500–700 p.s.i. to form a sheet 0.08 in. thick. The cured product had the following properties.

Ultimate tensile strength—2525 p.s.i.
Ultimate elongation—470%
300% modulus—1910 p.s.i.

A molded button was prepared as in Example 1 and found to have a compression set of 35.

EXAMPLE 5

668 parts of linear high molecular weight chlorinated polyethylene having a chlorine content of 32.7% and an intrinsic viscosity of 3.80 was charged to the equipment of Example 1. A gaseous mixture of sulfur dioxide and chlorine in which the weight ratio of sulfur dioxide to chlorine was 16.2:1 was fed into the reactor at a rate of 775 parts per hour while maintaining the reactants at 35° C. and exposing them to incident light. The chlorosulfonation was continued for 4 hours giving a product having a chlorine content of 34.9% by weight, a sulfur content of 2.88% by weight, and an intrinsic viscosity of 3.34.

The chlorosulfonated product was compounded in accordance with the recipe of Example 1 and part of this composition was cured in a mold for 15 minutes at 330° F. and a pressure of 500–700 p.s.i. to form a sheet 0.08 in. thick. The cured product had the following properties.

Ultimate tensile strength—2575 p.s.i.
Ultimate elongation—270%

A molded button was prepared as in Example 1 and found to have a compression set of 27.8.

EXAMPLE 6

1000 parts of linear high molecular weight chlorinated polyethylene having a chlorine content of 29.7% and an intrinsic viscosity of 3.18 was charged to the equipment of Example 1. A gaseous mixture of sulfur dioxide and chlorine in which the weight ratio of sulfur dioxide to chlorine was 16.2:1 was fed into the reactor at a rate of 775 parts per hour while maintaining the reactor at 40° C. Actinic light was provided by two ultraviolet lights positioned 18 inches from the glass reaction vessel. The chlorosulfonation was continued for 40 minutes giving a product having a chlorine content of 30.3% by weight and a sulfur content of 0.92% by weight and an intrinsic viscosity of 3.38.

The chlorosulfonated product was compounded in accordance with the recipe of Example 1 and part of this composition was cured in a mold for 15 minutes at 330° F. and a pressure of 500–700 p.s.i. to form a sheet having a thickness of 0.08 inch. The product had the following properties.

Ultimate tensile strength—3162 p.s.i.
Ultimate elongation—375%
300% modulus—2562 p.s.i.

A molded button was prepared as in Example 1 and found to have a compression set of 18.

EXAMPLE 7

4500 parts of linear high molecular weight chlorinated polyethylene having a chlorine content of 41.5% and an intrinsic viscosity of 2.98 was reacted in a glass-lined rotary drier with a gaseous mixture of sulfur dioxide and chlorine containing 15.2 parts of sulfur dioxide per part of chlorine. The gaseous mixture was fed into the rotary drier at a rate of 650 parts per hour while maintaining the reactants at 45° C. and exposing them to the light of one ultraviolet lamp. The chlorosulfonation was continued for 12 hours giving a product having a chlorine content of 40.9% by weight, a sulfur content of 0.67% by weight, and an intrinsic viscosity of 3.24.

The chlorosulfonated product was compounded in accordance with the recipe of Example 1 and part of this composition was cured in a mold for 15 minutes at 330° F. and a pressure of 500–700 p.s.i. to form a sheet having a thickness of 0.08 inch. The product had the following properties.

Ultimate tensile strength—2500 p.s.i.
Ultimate elongation—390%

A molded button was prepared as in Example 1 and found to have a compression set of 37.2.

EXAMPLE 8

830 parts of linear high molecular weight chlorinated polyethylene having a chlorine content of 32.6% and an intrinsic viscosity of 3.53 was charged to the equipment of Example 1. A gaseous mixture of sulfur dioxide and chlorine containing 16.2 parts sulfur dioxide per part chlorine was fed into the reactor at a rate of 775 parts per hour while maintaining the reactants at 36° C. The reaction was run in the presence of incident light. The chlorosulfonation was continued for 1.75 hours giving a product having a chlorine content of 33.7%, a sulfur content of 1.5%, and an intrinsic viscosity of 3.82.

The chlorosulfonated product was compounded in accordance with the recipe of Example 1 and cured in a mold for 15 minutes at 330° F. and a pressure of 500–700 p.s.i. to form 0.08-inch thick sheets. The product had the following properties.

Ultimate tensile strength—2730 p.s.i.
Ultimate elongation—300%
300% modulus—2760 p.s.i.

Compression set was measured in accordance with ASTM D 395–55 using an alternative type of test specimen composed of plied up pieces of the above sheet material rather than molded buttons as in the previous examples. The compression set was 32.

As a comparison, a commercially available chlorosulfonated polyethylene, which was prepared by solution chlorosulfonation of linear polyethylene having a melt index greater than 0.2 and which had a chlorine content of 34.9%, a sulfur content of 1.03%, and an intrinsic viscosity of 1.04, was compounded in accordance with the recipe of Example 1 and formed into an 0.08-inch thick sheet by the above-described molding procedure. The product had the following properties.

Ultimate tensile strength—2730 p.s.i.
Ultimate elongation—400%
300% modulus—1480 p.s.i.
Compression set (plied specimen)—68

EXAMPLE 9

To compare the chlorosulfonated polyethylene of this invention with the products obtained by solution chlorination of linear polyethylene having melt indexes of greater than 0.2, compositions were prepared in accordance with the recipe for tire black stock given in Example 7 of U.S. Pat. 3,001,969 to Miller, except that the liquid chlorinated hydrocarbon paraffin wax that we employed contained 40% chlorine rather than 50% chlorine. Additional compositions were prepared following the recipe of Example 1 of the above patent, except for the omission of the chlorinated wax. The chlorosulfonated polyethylenes employed by us were (1) the chlorosulfonated polyethylene prepared in Example 8 above, hereinafter referred to as "chlorosulfonated polyethylene A"; (2) the commercially available chorosulfonated polyethyene described in Exampe 8, hereinafter referred to as "chlorosulfonated polyethylene B"; (3) the polymer employed in Example 7 of the above-cited patent, hereinafter referred to as "chlorosulfonated polyethylene C" which had a chlorine content of 37.5%, a sulfur content of 0.6%, and was prepared by solution chlorosulfonation of linear polyethylene having a density of 0.96 and a melt index of 0.6. The recipes and the physical properties for each composition are summarized in the following table. The physical properties shown for chlorosulfonated polyethylene "C" were taken from U.S. Pat. 3,001,964.

TABLE 1

| | Parts by weight | | | | |
|---|---|---|---|---|---|
| Chlorosulfonated polyethylene: | | | | | |
| "A" | 50 | | | 100 | |
| "B" | | 50 | | | 100 |
| "C" | | | 50 | | |
| Chlorinated wax: | | | | | |
| 40% chlorine | 50 | 50 | | | |
| 50% chlorine | | | 50 | | |
| PbO | 25 | 25 | 25 | 25 | 25 |
| BaSO₄ | 71.7 | 71.7 | 71.7 | 71.7 | 7.7 |
| Carbon black (SRF) | 29 | 29 | 29 | 29 | 29 |
| Benzothiazyl disulfide | 0.5 | 0.5 | 0.5 | 0.5 | 0.5 |
| Tetrone A (dipentamethylene thiuram tetrasulfide) | 2 | 2 | 2 | 2 | 2 |
| Cured 30 minutes at 306° F. | | | | | |
| Ultimate tensile strength, p.s.i.[1] | 1,580 | 930 | 1,350 | 3,010 | 2,100 |
| 100% modulus, p.s.i.[1] | 530 | 280 | 250 | 1,380 | 600 |
| Ultimate elongation, percent[1] | 260 | 260 | 400 | 225 | 240 |
| Tear (Die B)[2] | 150 | 130 | | 250 | 170 |
| Compression set (70 hrs./100° C.)[3] | 54.6 | 83 | 74 | 30.8 | 77.5 |
| Cured 30 minutes at 330° F. | | | | | |
| Ultimate tensile strength, p.s.i.[1] | 2,050 | 1,350 | | 3,450 | 2,750 |
| 100% modulus, p.s.i.[1] | 600 | 20 | | 1,300 | 600 |
| Ultimate elongation, percent[1] | 280 | 320 | | 220 | 280 |
| Tear (Die B)[2] | 153 | 129 | | 208 | 184 |

[1] ASTM D 412–51T.
[2] ASTM D 624–54.
[3] ASTM D 395–55 (plied specimen).

The comparative data of Examples 8 and 9 show that for a given formulation and cure cycle superior tensile strength, modulus, tear resistance, and recovery from compressive deformation are obtained employing the chlorosulfonated polyethylene of this invention rather than the previously known solution chlorosulfonated polyethylenes. Further, as shown in Example 9, the addition of an extender such as chlorinated wax diminishes the strength of chlorosulfonated polyethylene, but at a given loading, the chlorosulfonated polyethylene of this invention has greater strength properties than the solution chlorosulfonated polyethylene. Thus, in meeting a given set of property requirements, more extender can be added to applicants' chlorosulfonated polyethylene.

It will be apparent that many modifications and variations may be effected without departing from the scope of the novel concepts of the present invention, and the illustrative details disclosed are not to be construed as imposing undue limitations of the invention.

We claim:
1. A process for the preparation of high molecular weight, substantially noncrystalline, chlorosulfonated polyethylene comprising contacting at 0° to 100° C. in the absence of solvent, particulate chlorinated polyethylene having a chlorine content ranging from about 20% to about 50% by weight, less than 1% crystallinity, and an intrinsic viscosity of at least 2.5 deciliters per gram in o-dichlorobenzene at 100° C., with a gaseous mixture of chlorine and sulfur dioxide, wherein the weight ratio of sulfur dioxide to chlorine in said gaseous mixture ranges from about 20:1 to about 1:10.

2. A process in accordance with claim 1 wherein said chlorinated polyethylene has an intrinsic viscosity ranging from about 2.5 to about 6.0 deciliters per gram in o-dichlorobenzene at 100° C. and wherein said contacting is effectuated in the substantial absence of light.

3. A process in accordance with claim 1 wherein said contacting is effectuated in the presence of actinic light.

References Cited
UNITED STATES PATENTS

| | | | |
|---|---|---|---|
| 2,972,604 | 2/1961 | Reynolds et al. | 260—79.3 |
| 2,994,688 | 8/1961 | King | 260—79.3 |
| 3,022,276 | 2/1962 | Orthner et al. | 260—79.3 |
| 3,206,444 | 9/1965 | Gumboldt et al. | 260—79.3 |
| 3,347,835 | 10/1967 | Lorenz | 260—79.3 |
| 3,258,445 | 6/1966 | Schwander et al. | 260—94.9 |

JAMES A. SEIDLECK, Primary Examiner

U.S. Cl. XR.

260—23, 27, 28.5, 41, 79.5, 94.9